May 8, 1945.   F. B. HOWELL   2,375,654
AUTOMOTIVE GEAR SHIFT INDICATOR
Filed June 1, 1942    3 Sheets-Sheet 1
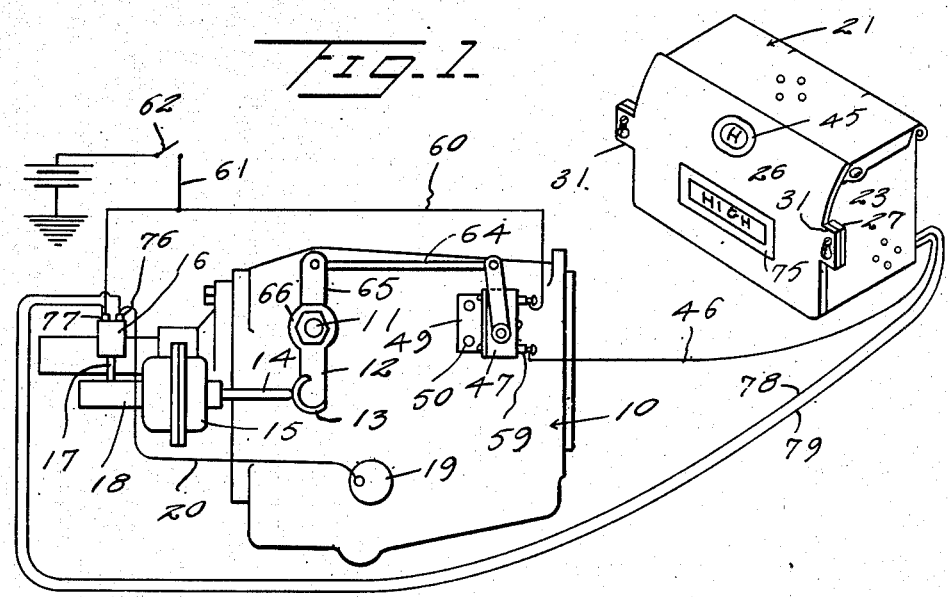
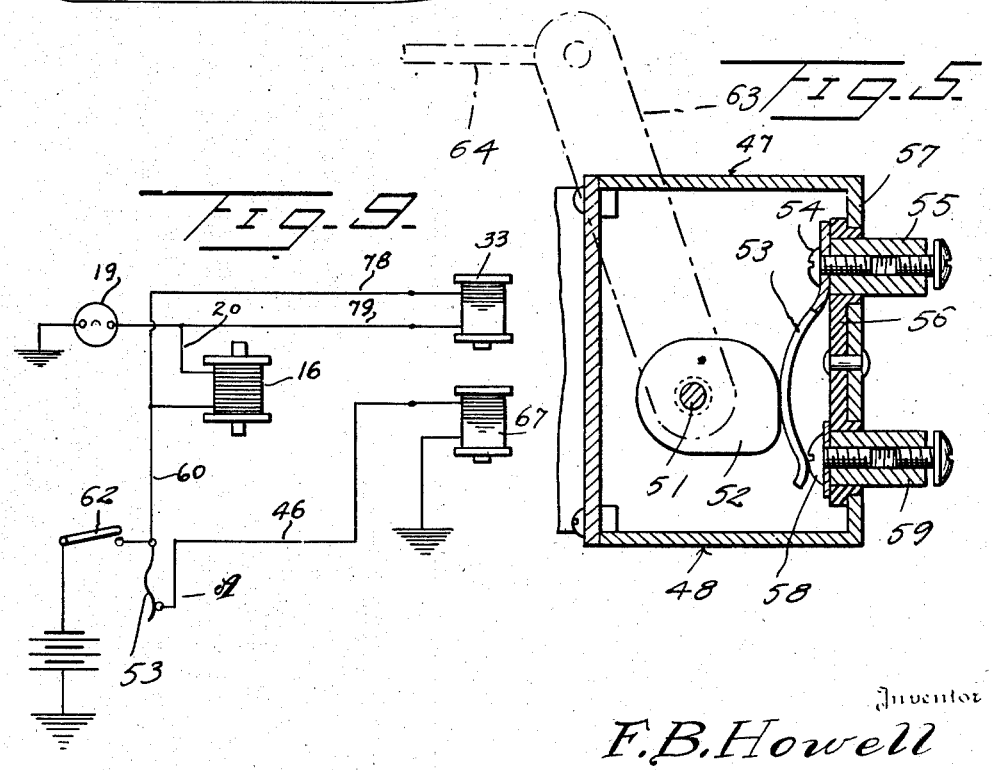
Inventor
F. B. Howell
By Kimmel & Crowell
Attorneys

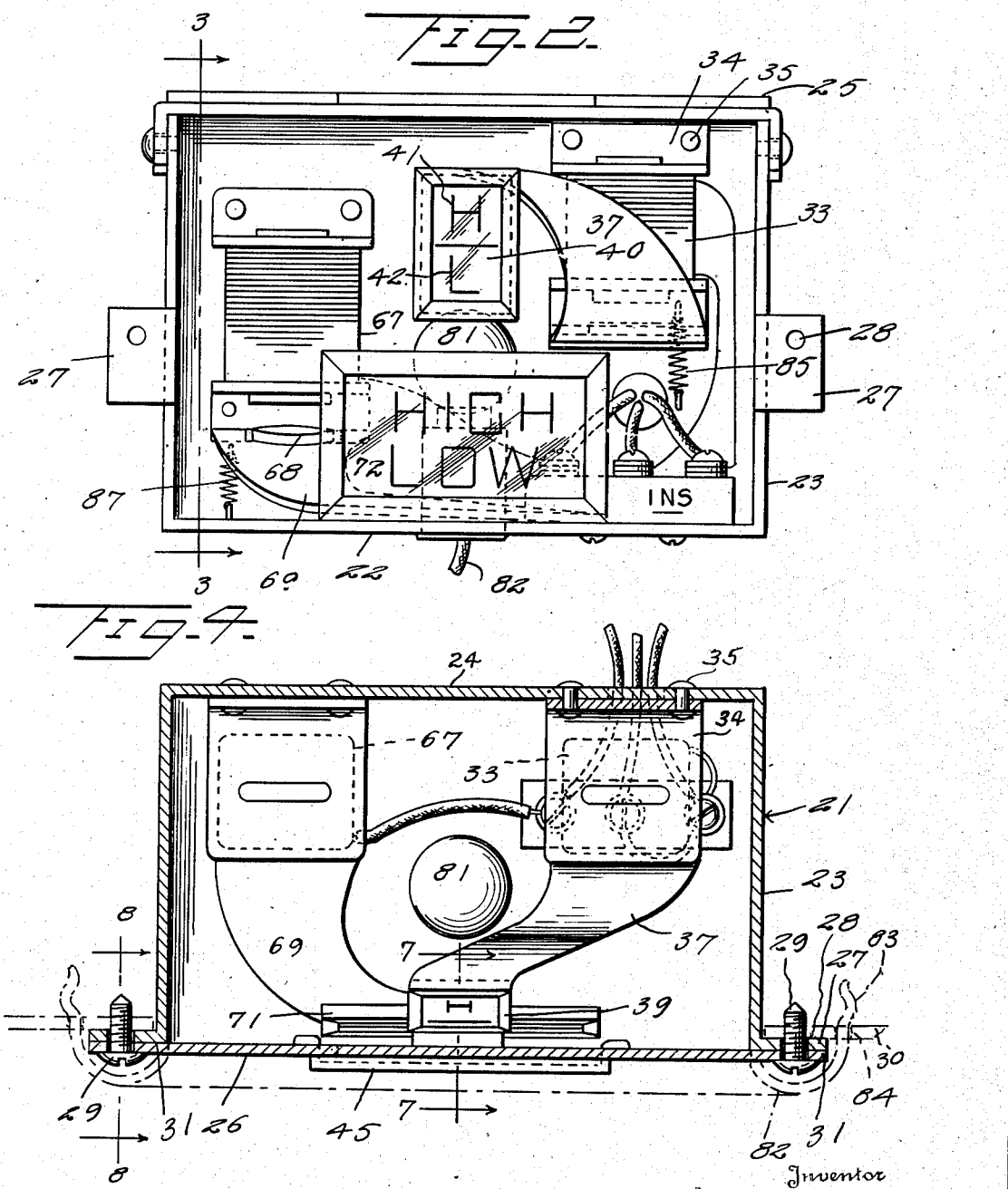

May 8, 1945.   F. B. HOWELL   2,375,654
AUTOMOTIVE GEAR SHIFT INDICATOR
Filed June 1, 1942   3 Sheets-Sheet 3
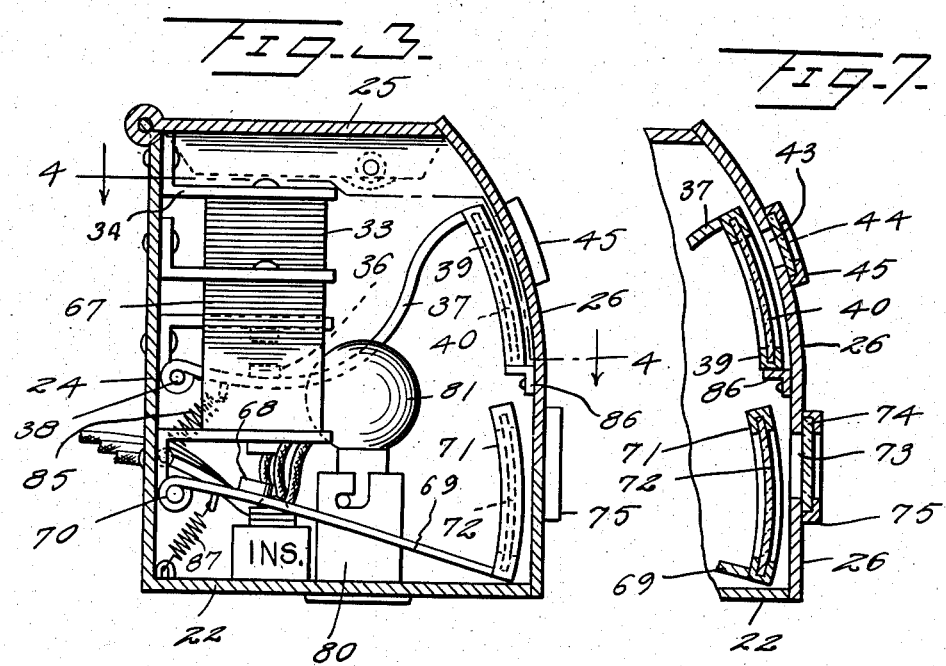
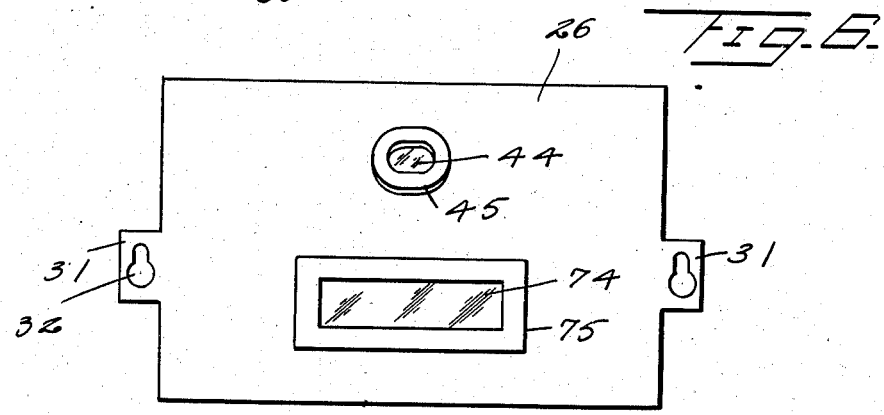
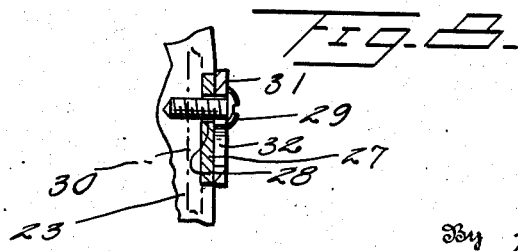
Inventor
F. B. Howell
By Kimmel & Crowell
Attorneys Patented May 8, 1945

2,375,654

UNITED STATES PATENT OFFICE 2,375,654

AUTOMOTIVE GEARSHIFT INDICATOR

Frederic B. Howell, Wilkes-Barre, Pa.

Application June 1, 1942, Serial No. 445,341

3 Claims. (Cl. 177—311)

This invention relates to an indicator for indicating the gear positions of an automatic transmission.

An object of this invention is to provide an electrically operated signal and indicator assembly for connection with an automatic transmission which will not only give an indication as to the gear ratio or assembly which is in operation, but will also give an indication as to time for changing the gears.

In automatic vehicle transmissions at present in use, while the operator of the vehicle is relieved of the necessity of manually shifting gears, such transmissions incorporate means under the manual control of the operator, whereby the gear change may be effected after the vehicle has attained a predetermined speed. The physical change of gears is effected automatically and in most instances the character of the gears is such that they are substantially noiseless. In setting up the automatic gear change mechanism in certain instances, this is accomplished at a predetermined vehicle speed by the operator releasing the throttle pedal for a moment and subsequently depressing this pedal. One of the faults of this system is that the operator either releases and depresses the throttle pedal too quickly and before the automatic changing mechanism is effective, or holds the throttle pedal in released position for a period in which the vehicle speed is reduced to a point where the gear change cannot be effected.

It will, therefore, be apparent that the operator, under conditions of this kind, frequently assumes that the proper gear change has been automatically made, whereas actually the gear change has not been made, and the subsequent operation of the vehicle is made under improper gear conditions and uneconomically as to engine operation. It is, therefore, a further object of this invention to provide an electrically operated indicator and signal assembly which will apprise the operator of the exact gear condition both as to meshed gears and as to the possibility of effecting a change in the gears.

A further object of this invention is to provide a structure of this kind which is economical in operation and which will not unduly drain the electric current from the battery.

A further object of this invention is to provide a device of this kind in which the indicator and signal structure may be mounted at any desired point in the vehicle, such as on the dashboard, steering column or other point visible to the driver of the vehicle.

To the foregoing objects and to others which may hereinafter appear, the invention consists of the novel construction, combination and arrangement of parts as will be more specifically referred to and as illustrated in the accompanying drawings, wherein is shown an embodiment of the invention, but it is to be understood that changes, variations and modifications may be resorted to which fall within the scope of the invention as claimed.

In the drawings:

Figure 1 is a detail side elevation of an automatic transmission showing diagrammatically a signal device connected therewith for indicating the shifting operation of the automatic transmission, Figure 2 is a detail front elevation of the signal structure with the front removed therefrom, Figure 3 is a sectional view taken on the line 3—3 of Figure 2, Figure 4 is a sectional view taken on the line 4—4 of Figure 3, Figure 5 is a vertical section taken through the switch which is mounted on the transmission and connected to the signal device, Figure 6 is a detail front elevation of the front cover of the signal housing, Figure 7 is a fragmentary sectional view taken on the line 7—7 of Figure 4, Figure 8 is a fragmentary sectional view taken on the line 8—8 of Figure 4, and Figure 9 is a diagrammatic view of the electric circuits embodied in this invention.

Referring to the drawings, the numeral 10 designates generally an automatic transmission which is provided with automatic means for effecting a shifting of the gearing, which shifting operation is effected by release and subsequent depression of the accelerator pedal of the motor vehicle. The transmission 10 is provided with a rock shaft 11 which constitutes the gear shifting shaft and which has secured thereto a depending lever 12 formed with an arcuate head 13 at the lower end thereof. The lever 12 is rocked rearwardly or to the left under the action of an inner spring in the transmission 10 and is held against rearward rocking by a vacuum-operated shifter rod 14 which is connected with a vacuum-operator 15 secured to one side of the housing 10. The movement of the shifter rod 14 is controlled by means of a solenoid 16 which has a core 17 extending downwardly into the rear portion 18 of the operator 15 so that when the core 17 is in a lowermost position, the operator 14 is thereby held against rearward movement and thereby locks the lever 12 against clockwise movement. Counterclockwise movement of the lever is effected by the vacuum operator 15 which moves the rod 14 forwardly or to the right. The solenoid 16 is automatically energized and de-energized under the action of a centrifugally operated switch 19 which is connected to the transmission 10 and which has one side thereof grounded and the other side connected by means of a conductor 20 to the solenoid 16.

In the normal operation of the transmission 10, when the vehicle attains a predetermined speed, the operator of the vehicle releases the accelerator pedal, and this release of the accelerator pedal will permit the vacuum operator 15 to shift the rod 14 and the lever 12. The shifting operation is effected rather quickly and if the operator of the vehicle permits the accelerator pedal to remain in its released position for too long a period, the speed of the vehicle will be reduced to such a point whereby the centrifugal switch 19 will be moved to a closed position and the solenoid 16 will be active to cut off the vacuum connection between the engine and the vacuum operator 15 thereby preventing shifting of the rod 14 by the operator 15. Under another condition if the operator of the vehicle does not leave the accelerator pedal in a released position for a sufficiently long period of time, the operator 15 will be unable to effect a shifting of the rod 14 and consequent rocking of the shifting lever 12. It will, therefore, be apparent that the operator of the vehicle will not be able to determine visibly in what gear ratio the transmission 10 is operating and frequently the transmission 10 is operating at an undesired gear ratio.

In order therefore to provide a means whereby the operator of the vehicle may determine the exact moment at which the accelerator pedal may be released and subsequently depressed to effect the completion of the gear shifting operation, I have provided an electrically operated signal structure generally designated as 21 which is adapted to be positioned remote from the transmission 10, and preferably mounted on the dashboard, steering column or any other suitable position convenient to the sight of the vehicle operator.

The signal structure 21 includes a housing formed with a bottom wall 22, opposite side walls 23, a rear wall 24, a hinged top wall 25 and a removable front wall 26. The side walls 23 are formed with outwardly projecting ears 27 formed with openings 28 through which fastening devices 29 are adapted to be extended for securing the housing 21 on a support, such as a dashboard 30. The front wall 26 is also formed with a pair of ears 31 having buttonhole slots 32 therein so that the front wall 26 may be removed by merely loosening the fastening members 29 and then raising the wall 26 to the large portion of the buttonhole slot 32.

The housing 21 has mounted therein an electro-magnetic coil 33 which is secured to an L-shaped bracket 34 fixed by fastening members 35 to the rear wall 24. An armature 36 is mounted on a longitudinally arcuate signal carrier 37 which is pivoted as at 38 to the rear wall 24. The carrier 37 has secured to the forward end portion thereof a substantially rectangular frame 39 which is U-shaped in transverse section and which has mounted therein a translucent panel 40 formed with characters 41 and 42. The character 41 is in the form of the letter "H" indicating high, and the character 42 is in the form of the letter "L" indicating low, so that when one of the characters 41 or 42 is disposed in registry with a window 43 formed in the front wall 26, the operator of the vehicle will know that the opportunity is present for effecting a shifting of the transmission to the gearing indicated by the characters 41 and 42.

The window 43 has a transparent panel 44 secured thereacross, the panel 44 being mounted in a frame 45 which is fixed to the outer side of the front wall 26. The coil 33 is adapted to be connected across the terminals 76 and 77 of the solenoid 16 by means of a pair of conductors 78 and 79. In this manner, when the solenoid is energized by the closing of the centrifugal switch 19, the coil 33 will also be energized and the carrier 37 will be raised to bring the character "L" in registry with the window 43.

The housing 21 also has mounted therein a second electro-magnetic coil 67 and an armature 68 is mounted on a carrier 69 which is pivoted as at 70 to the rear wall 24 of the housing 21. The forward end of the carrier 69 has secured thereto a rectangular frame 71 in which is mounted a translucent signal panel 72. The panel 72 has the words "High" and "Low" positioned thereon for registry with a window 73 which is formed in the lower portion of the front wall 26. A transparent panel 74 is mounted in the frame 75 secured to the front wall 26, and when the carrier 69 is in the lowermost position with the coil 67 de-energized, the word "High" will be in registry with the window 73. When the coil 67 is energized the armature 68 will be drawn upwardly thereby raising the carrier 69 and disposing the word "Low" in registry with the window 73. One side of the coil 67 is grounded and the other side is connected by means of a conductor 46 to a switch structure 47 mounted on one side of the transmission 10. The switch structure 47 includes a box-like housing 48 which has a flange 49 secured by fastening members 50 to the transmission 10.

The rock shaft 51 is rockably mounted in the housing 48 and has fixed thereto a cam-shaped switch operator 52 which is adapted to contact with a resilient movable switch member 53. The switch member 53 is secured by means of a fastening device 54 to a terminal 55 and an insulated plate 56 is interposed between the fixed end of the switch member 53 and the adjacent wall 57 of the housing 48. A stationary contact 58 is disposed in a position for engagement with the switch member 53 when the member 53 is rocked forwardly by the cam operator 52 and the contact 58 is secured to a terminal 59 extended through the wall 57 of the housing 48.

The terminal 59 is connected on the opposite end to the conductor 46 and the terminal 55 is connected by means of conductors 60 and 61 to the ignition switch 62. The shaft 51 has fixed thereto on the outside of the housing 48 a rock lever 63 which is connected by means of a link 64 to an upwardly extending lever extension 65. The lever extension 65 is fixed to the boss 66 of the lever 12 and extends oppositely from the lever 12 so that rocking of the lever 12 in one direction will effect rocking of the lever 63 to thereby move the switch member 53 to a circuit closing position.

A socket 80 is mounted within the housing 21 rearwardly of the windows 43 and 73 and has a light bulb 81 mounted therein, the light bulb 81 being preferably connected through the conductor 82 to the lighting circuit of the vehicle. One side of the light bulb 81 may be grounded through the housing 21.

In order to provide a means whereby the front wall 26 may be additionally secured to the panel 30 and in order to provide a trim about the marginal portions of the front wall 26, I have provided a bezel or substantially rectangular frame 82 which is formed with a pair of resilient tangs or clips 83 for engagement in openings 84 formed in the panel 30. The bezel or trim 82 is adapted to cover the fastening members 29 and the bezel 82 as shown in Figure 4, is of transversely arcuate configuration forming an arcuate beading about the marginal portions of the front wall 26.

In the use and operation of this signal structure, the housing 21 is adapted to be mounted at the desired location within the vehicle, preferably, on the dashboard and the conductors 46, 78 and 79 are adapted to be connected to the switch 47 and the solenoid 16.

When the ignition switch 62 is in the "Off" or open position, the signal structure is inoperative. When the ignition switch 62 is closed and during the initial movement of the vehicle the centrifugal switch 19 will be closed and the two conductors 78 and 79 which bridge the solenoid 16 will cause the relay 33 to be energized, thereby raising the armature 36 and bringing the lower portion of the translucent signal panel 40 into registery with the window 43 and the character "L" designating "Low" will be exposed through the window 43. At the same time, the switch 47 will be in closed position and will cause the relay 67 to be energized through the conductor 46, thereby raising the armature 68 and bringing the lower portion of the translucent signal panel 72 into registry with the window 73. The lower portion of the signal panel 72 carries the word "Low" which at this time will be exposed through the window 73.

The driver of the vehicle by looking at the window 73 will know that the transmission is operating in one of two manually selected low gear ratios. After the vehicle has attained a predetermined speed, the solenoid 16 will become de-energized by breaking of the electric circuit thereto from the centrifugal switch 19. This will break the circuit through the relay 33 and permit the carrier 37 to drop downwardly to the position shown in Figure 3, thereby exposing the character "H" through the window 43.

The operator of the vehicle will thereupon be given notice that the transmission 10 is in an operating position whereby the accelerator pedal may be released so as to thereby effect a change to a higher gear ratio of the transmission by means of the internal mechanism forming a conventional part of the transmission. When the driver of the vehicle thereupon releases the accelerator pedal, the vacuum operator 15 will effect movement to the left of the shifting lever locking member 14 so that the internal mechanism of the transmission 10 will be able to rock the shaft 11 clockwise and effect the shifting of the transmission to the higher gear ratio.

The rocking of the shaft 11 clockwise will permit the switch member 53 to move to a released position with respect to the contact 58. This will break the circuit to the relay 67 and permit the carrier 69 to drop downwardly to the position shown in Figure 3 and expose the word "High" on the translucent panel 72 through the window 73. The driver of the vehicle will thereupon know by glancing at the window 73 that the transmission 10 is operating in the selected higher gear ratio.

In the event in the shifting of the gear by operation of the accelerator pedal, the speed of the vehicle should lessen to a degree whereby the centrifugal switch 19 should again close the electric circuit to the solenoid 16, the relay 33 would be immediately energized and the carrier 37 raised bringing into view the character "L" carried by the panel 40 and the driver of the vehicle would be given notice that notwithstanding the fact that the driver should perform the normal operations with the accelerator pedal to effect a gear change to a higher gear ratio the selected gear change would not be effected.

In the event the gear change was not effected, the driver of the vehicle would have to operate the vehicle at a substantially increased speed to cause the centrifugal switch 19 to break the electric circuit to the solenoid 16, whereupon the driver would have to go through the normal gear changing operation which is regulated by the accelerator pedal. The relays used in the signal structure hereinbefore described are of low battery drain so their operation will not require any additional electic current sufficient to increase the size of the battery or the amount of current normally flowing into or through the battery.

The arm or lever 37 is spring pressed to a lower position by means of a spring 85 and the lower edge of the panel frame 39 is adapted to normally contact any angle-shaped stop ledge 86 secured to the inner side of the front wall 26. The arm or lever 69 is also spring pressed to a lower position by means of a spring 87 and the lower edge of the panel frame 71 is adapted to normally contact the bottom wall 22 of the housing. When the coils 33 and 67 are de-energized, the springs 85 and 87 will lower the arms 37 and 69, respectively, and an audible click will be sounded to thereby give audible notice to the driver that the gear change has been effected. The transparent or translucent panels 40 and 72 may be provided with different colored upper and lower portions so that the driver will know by the color of the exposed portion of a panel the exact gear changing condition.

The electrically operated signal structure hereinbefore described is an improvement over the mechanically operated signal structure which is embodied in my co-pending application Serial Number 410,116, filed September 8, 1941, Patent Number 2,324,396.

What I claim is:

1. A gear shift indicator for connection with a transmission having a movable gear changing element, said indicator comprising a signal housing remote from said transmission, a rockable signal carrier in said housing, a window in said housing for exposing indicia on said signal carrier positioned in registry with window, an electromagnetic operator for said carrier in said housing, an electric switch, conductors connecting said switch with an electric source and with said operator, and mechanical means correlating said switch with said movable element whereby movement of said element will effect energization and de-energization of said operator and simultaneous movement of said carrier; energization of said operator and movement of said carrier in one direction giving indication of one gear position, de-energization of said operator and return of carrier to the initial position giving a visible indication of a second gear position, and striking of said carrier against the core of said electromagnetic operator in one direction and against the bottom of said housing in the other direction giving an audible indication that a change of gears has taken place.

2. In an automatically shiftable transmission having a manually actuated means for controlling the automatic shifting, said manually actuated means being effective or non-effective in accordance with the vehicle speed, and an electrically operated regulator means for governing the change from said effective to said non-effective stage; a rockable signal carrier, an electromagnetic operator for said carrier, and conductors connecting said operator with said regulating means for energizing said operator simultaneously with said regulating means; energizing of said operator causing movement of said carrier in one direction and giving a visible indication of said non-effective stage, de-energizing of said operator allowing return of said carrier to initial position and giving a separate visible indication of said effective stage, and striking of carrier against core of said electromagnetic operator in one direction and against a step provided in the other direction producing an audible indication that a change has occurred in said regulating means.

3. In an automatically shiftable transmission provided with manually actuated means for controlling the automatic shifting operation, said manually actuated means being effective or non-effective in accordance with the vehicle speed; a gear shift indicator comprising a combination of a single electrically operated signal unit connected with said transmission and actuated thereby for producing a visible indication of said effective stage, a separate visible indication of said non-effective stage, and an audible signal at the moment of change from one stage to the other said stage; and a second single electrically operated signal unit connected with said transmission and actuated thereby for producing a separate visible indication of each of two gear positions and an audible signal at the moment of the completion of the change from one gear position to the other gear position.

FREDERIC B. HOWELL.